United States Patent
Namala

(10) Patent No.: US 11,937,690 B2
(45) Date of Patent: Mar. 26, 2024

(54) AUTOMATICALLY ADJUSTABLE DESK WITH USAGE TRACKING AND METHODS THEREOF

(71) Applicant: QualGear LLC, Plano, TX (US)

(72) Inventor: Ramesh Namala, Allen, TX (US)

(*) Notice: Subject to any disclaimer, the term of this patent is extended or adjusted under 35 U.S.C. 154(b) by 0 days.

(21) Appl. No.: 15/967,563

(22) Filed: Apr. 30, 2018

(65) Prior Publication Data

US 2019/0328128 A1    Oct. 31, 2019

(51) Int. Cl.

| | | |
|---|---|---|
| *A61B 5/01* | (2006.01) | |
| *A47B 9/10* | (2006.01) | |
| *A47B 21/02* | (2006.01) | |
| *G05B 19/416* | (2006.01) | |

(52) U.S. Cl.
CPC .......... *A47B 21/02* (2013.01); *A47B 9/10* (2013.01); *G05B 19/416* (2013.01); *A47B 2200/0039* (2013.01); *A47B 2200/0056* (2013.01); *A47B 2200/0062* (2013.01); *G05B 2219/41326* (2013.01)

(58) Field of Classification Search
CPC ... A47B 9/10; A47B 21/02; A47B 2200/0039; A47B 2200/0056; A47B 2200/0062; A47B 9/00; G05B 19/416; G05B 2219/41326; A61B 5/01

USPC .......................................................... 318/3
See application file for complete search history.

(56) References Cited

U.S. PATENT DOCUMENTS

| | | | |
|---|---|---|---|
| 10,133,261 B2* | 11/2018 | Labrosse | A47B 97/00 |
| 2012/0013540 A1* | 1/2012 | Hogan | G06F 40/177 |
| | | | 345/173 |
| 2013/0200579 A1* | 8/2013 | Abernethy | B62B 3/001 |
| | | | 280/6.15 |
| 2015/0257952 A1* | 9/2015 | Zerhusen | A61G 7/0513 |
| | | | 340/12.5 |
| 2016/0051042 A1* | 2/2016 | Koch | H02K 11/40 |
| | | | 318/446 |
| 2016/0170402 A1* | 6/2016 | Lindström | A47B 9/00 |
| | | | 700/275 |
| 2016/0217536 A1* | 7/2016 | Camp | G06Q 50/12 |
| 2017/0135587 A1* | 5/2017 | Desroches | A61B 5/01 |
| 2017/0358138 A1* | 12/2017 | Dack | G06F 1/163 |
| 2018/0154860 A1* | 6/2018 | Thieberger | B60R 21/0136 |
| 2018/0279770 A1* | 10/2018 | Crowe | A47B 9/10 |
| 2019/0223586 A1* | 7/2019 | Hansen | G06V 40/12 |
| 2020/0154881 A1* | 5/2020 | Applegate | A47B 3/0815 |

* cited by examiner

*Primary Examiner* — Cortez M Cook

(57) ABSTRACT

An apparatus and method for automatically adjusting and monitoring use of an adjustable standing desk are disclosed. The invention provides an electric adjustable desk with memory to store a user's preferred sitting and standing heights for the adjustable desk. A setup mode allows the user to store and adjust the preferred sitting and standing heights. A sensor allows the user to quickly adjust from the sitting to standing heights or vice versa.

11 Claims, 7 Drawing Sheets

AUTOMATICALLY ADJUSTABLE DESK WITH USAGE TRACKING AND METHODS THEREOF

BACKGROUND

The apparatus and methods disclosed herein relate to an automatically adjustable sitting or standing desk capable of monitoring the amount of usage in either mode. More specifically, the apparatus provides memory capable of storing the preferred sitting and standing heights for a user as well as indicating to a user the amount of time the user operates the desk in either sitting or standing modes. Additionally, the apparatus allows a user to adjust the desk into sitting or standing modes without the necessity of any physical input.

In a 2008 study titled "Amount of Time Spent in Sedentary Behaviors in the United States, 2003-2004" published in the American Journal of Epidemiology, it is estimated that the average American spends almost 55% of waking time (7.7 hours per day) in sedentary behaviors such as sitting. Other studies have concluded that women who sat for over 6 hours per day were 94% more likely to die than those who were physically active and sat for less than 3 hours per day; men who sat for over 6 hours per day were 48% more likely to die than their physically active counterparts. Further studies have found also concluded that people who sit for long periods of time have an increased risk of disease. A study in 2010 reported that prolonged periods of sitting can compromise metabolic health even in adults who otherwise meet physical activity recommendations. As such, in the past few years, the standing desk adoption have become widespread and have become a standard employee benefit.

Based on the various studies, there are number of benefits to decreasing the amount of time spent sitting in front of a desk. First, numerous studies have shown that excessive sitting shortens a person's life span by several years and increased the chance of dying from heart disease significantly.

It has been suggested that sitting is the ultimate passive activity, and that one burns more calories chewing gum than when one is merely slouching in a chair. When sitting it has been suggested that the electrical activity in the muscles flat lines, and the body consequently uses very little energy. Powering down the body like that for long periods of time can lead to a cascade of negative effects. Heart rate, calorie burn, insulin effectiveness, and levels of good cholesterol all drop. The body also stops producing lipoprotein, lipase and other molecules that are only released when flexing muscles, such as when standing and/or walking. These molecules play an important role in processing fats and sugars and without them, the body's metabolism suffers. Add these factors up, and it's no wonder that those who sit for long periods of time each day have larger waistlines and worse blood sugar and blood pressure profiles and are at higher risk of heart disease, diabetes, obesity, and cancer than who sit less.

Furthermore, when one sits, the heart rate and calorie burn go down. Weight gain typically creeps on gradually from consuming a few too many calories here and there and slowing down in small ways as we age. One individual test with a heart rate monitor found that the subject's heart rate was 10 beats higher when standing than sitting and the subject burned 30 calories in an hour of sitting as opposed to 72 in an hour of standing. A University of Chester study found standing to burn 42 more calories per hour compared to sitting.

Office workers are those mostly likely to be sitting in front of a desk most of the day. As such, office workers often experience back pain which stems from not using their backs enough. Years of slouching in a chair may take a substantial toll. Standing up engages your back muscles and improves one's posture. Anecdotally, many folks who have made the switch to a stand-up desk have reported that the change cured their back pain. One lab in Oregon concluded that people who sit more are at greater risk for herniated disk and strained cervical vertebrae in the neck leading to permanent imbalances. Numerous studies have indicated that an overwhelming majority of people felt healthier overall after standing at work.

In addition, standing increases one's focus and concentration in several ways. First, a standing individual is less likely to become drowsy and with the muscles engaged the individual stays alert. Second, standing allows the individual to be more active, shift from one leg to another, and pacing as desired, releasing restless energy, and improving focus and concentration. A study released by Office Ergonomics Research Committee found a 17.8% productivity gain when employees are supplied with ergonomic furniture, such as a standing desk.

The above examples are merely some of the well-known quantifiable advantages offered through a standing desk. Numerous other studies exist in this field.

Current Types of Adjustable Standing Desks and Desktops

Typical manually adjustable standing desks use a lever which allows the desk to be adjusted to a sitting height or a standing height. Once the lever is activated, a user manually pushes or lifts the desk to the desired height. Similarly, in an adjustable desktop, which sits on top of a standard desk, the lifting action is aided by a hydraulic. These desktops utilize a locking mechanism once the user adjusts the desk to the desired height, thus locking the desktop at that height and preventing accidental adjustments while in use.

Electric adjustable standing desks use up and down height adjustment buttons, typically located on the sides of the desk. However, prior art electric adjustable standing desks fail to provide ease for users to easily adjust to their optimal sitting and standing positions. Additionally, the prior art electrical adjustable standing fail to properly inform its user of the optimal duration of standing during a typical work day. It is an object of the present invention to address the deficiencies of the prior art by providing an automatically adjustable standing desk and desktop capable of remembering the optimal sitting and standing heights for its user as well as providing an interface to properly inform its user of the optimal duration to use the adjustable standing desk in the standing mode.

These and other advantages of the present invention will be clarified in the description of the preferred embodiments taken together with the figures.

SUMMARY OF THE INVENTION

An apparatus and method for automatically adjusting and monitoring use of an adjustable standing desk are disclosed. The invention provides an electric adjustable desk with memory to store a user's preferred sitting and standing heights for the adjustable desk. A setup mode allows the user to store and adjust the preferred sitting and standing heights. A sensor allows the user to quickly adjust from the sitting to standing heights or vice versa.

In another aspect, the adjustable standing desk includes wireless communications with a mobile app on a portable handheld device a measuring device to provide metrics regarding the user's use of the desk in the standing position to promote the user to reach optimal standing use.

In another aspect, an electric adjustable desktop for placing on top of a desk is disclosed.

DETAILED DESCRIPTION

Figure 1:
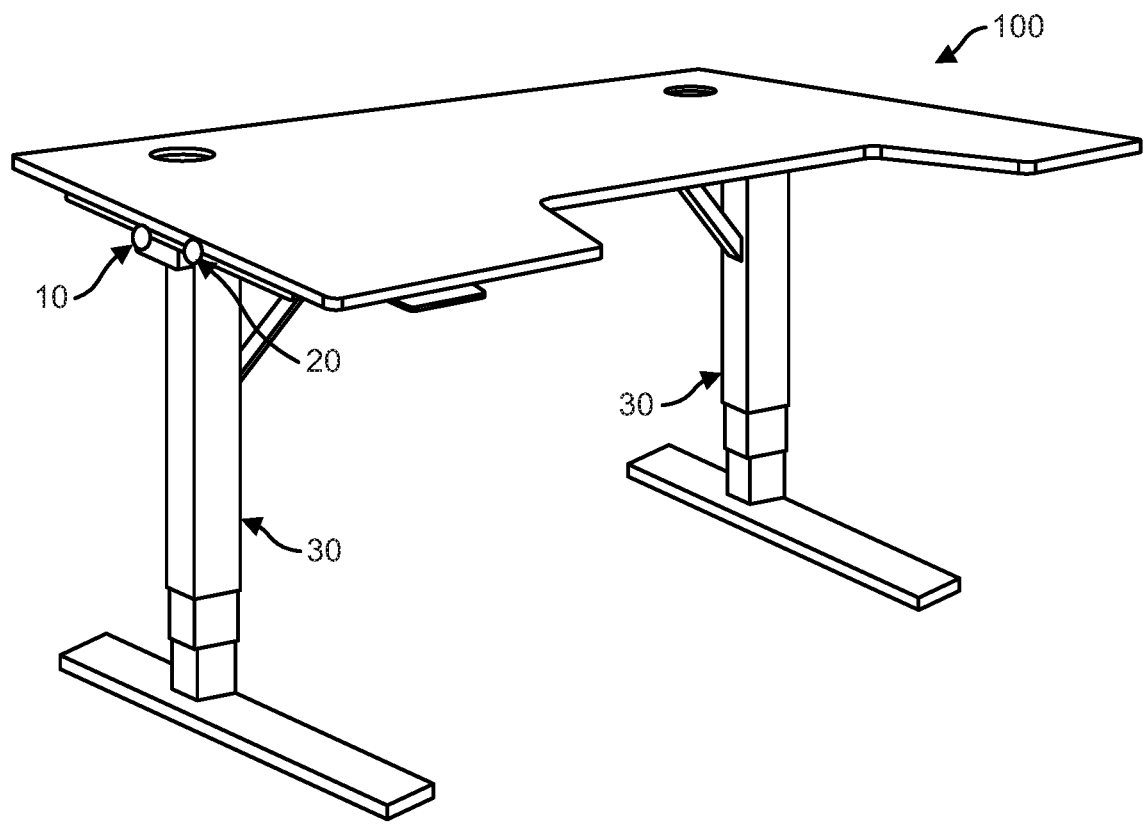
FIG. 1 is a perspective view of the adjustable standing desk in accordance with the invention.

While the inventions disclosed herein are susceptible to various modifications and alternative forms, specific embodiments are shown by way of examples in the drawings and described in detail. It should be understood that the figures and detailed description discussed herein are not intended to limit the invention to the particular forms disclosed. On the contrary, the intention is to cover all modifications, equivalents and alternatives falling within the spirit and scope of the present inventions as defined by the appended claims. Description will now be given of the invention with reference to FIGS. 1-7.

As shown generally in FIG. 1, the inventive automatically adjustable standing desk 100 includes two or more legs 30. The legs 30 are typically telescopic in nature and are controlled and operated by an electric motor. The legs 30 are designed such that the desk 100 has a wide range of heights to accommodate users of almost any height. As such, the desk 100 can be adjusted to a typical minimum sitting height of approximately 26" to a typical max height of 70". These minimum and maximum heights are for exemplary purposes only and may be modified without deviating from the spirit of the invention. In an alternate embodiment, legs 30 may be controlled by hydraulics.

The automatically adjustable standing desk 100 also includes sensor 10. In an exemplary embodiment, sensor 10 is located preferably on the side of the desk, at a position which avoids inadvertent triggering of sensor 10. Sensor 10 may be a single sensor or a plurality of sensors. A user may trigger sensor 10 with a hand gesture to indicate their desire to adjust the standing desk from the preferred sitting height to the preferred standing height. Additionally, multiple sensors may be used to determine a direction of a hand movement and allow for incremental movements of the adjustable standing desk 100. Sensors may be infrared, capacitive sensors, microwave, PIR, ultrasonic or any other motion sensors known in the art.

In an alternative embodiment, sensors may be replaced by height adjustment buttons wherein the buttons are correlated to the stored preferred sitting or standing heights. Sensor 10 may also be disposed at the front of the desk in a location which avoids inadvertent triggering of sensor 10. In another alternative embodiment, a sensor may detect an upward pressure is applied to the desk and automatically adjust the height to the other preset height. In addition to mechanical buttons, infrared sensors for hand gestures, upward pressure, in another alternate embodiment, the desk may include a voice capture device to allow for adjustments using voice input and speech recognition.

In the exemplary embodiment, an LED 20 is located on the side of desk 100. LED 20 is used as an indicator to inform the user the status of the desk. This includes indicating when the desk is in setup mode, when the desk is in normal operation mode, transmission mode, or when the desk is low on power. LED 20 may be a single LED with multiple colors or a cluster of LED arrangements wherein different colors or flashing patterns indicate different modes. For example, a steady green light from LED 20 indicates that the desk 100 is in standard operation mode. A flashing light from LED 20 may indicate that the desk is in height setup mode. Other modes of operation include a transmission mode wherein the desk 100 transmits usage data to the Internet or a smart device; a Bluetooth or Wi-Fi connectivity setup mode; or a mode indicating an error in operation.

Figure 2:
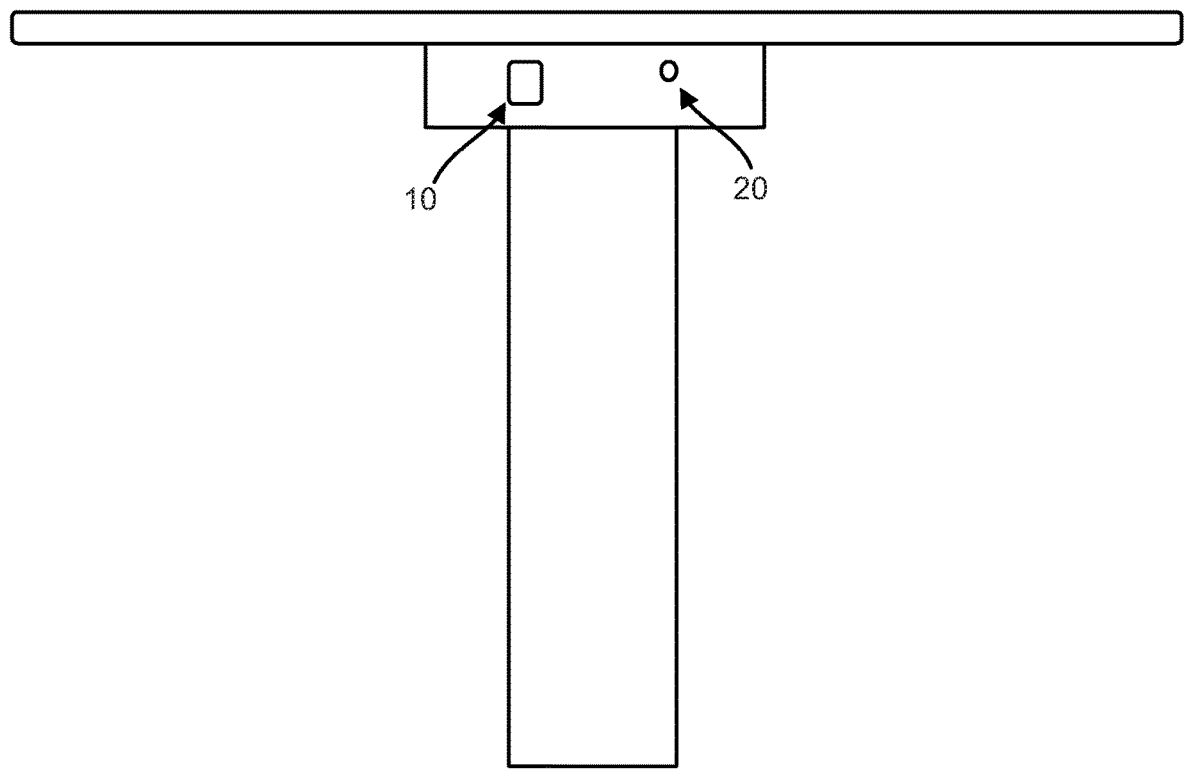
FIG. 2 is a close-up view of the controls of an exemplary adjustable standing desk in accordance with the invention.

FIG. 2 further illustrates the positioning of sensor 10 and LED 20 in the exemplary embodiment. In an alternate embodiment, multiple sensors 10 are located on two opposing sides of desk 100. In this embodiment, both sensors must be simultaneously triggered to adjust the desk height. The use of multiple sensors helps reduce the possibility of an inadvertent height adjustment. While LED 20 is disposed on the side of the desk in FIG. 2, LED 20 may also be disposed on any other area of the desk visible to the user to convey information regarding the operational mode of the desk 100. Additionally, desk may optionally include a small display for providing additional data to the user. For example, display may be used in identifying the exact height or used in setup of a Wi-Fi or Bluetooth connection.

Figure 3:
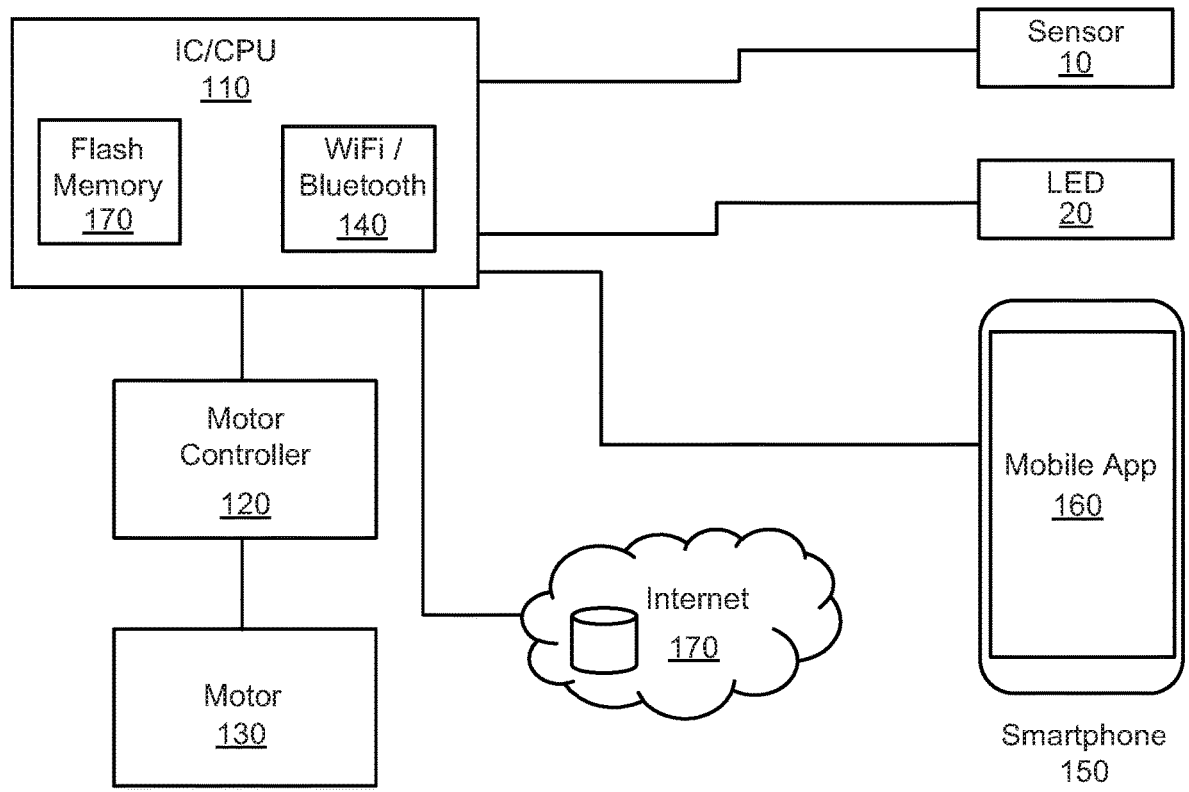
FIG. 3 is a component diagram of the electrical components for controlling the exemplary adjustable standing desk in accordance with the invention

FIG. 3 is a component diagram showing the electrical components of the exemplary adjustable standing desk in accordance with the present invention. Preferably, the desk 100 includes an integrated circuit/central processing unit 110 having a non-transitory memory 170 and a wireless transceiver 140. Exemplary integrated circuit/central processing unit 110 are microcontrollers or systems on a chip ("SoC") with integrated Wi-Fi and/or Bluetooth functionality. These are well known in the art and detailed discussion is omitted.

The microcontroller 110 is coupled to a motor controller 120. Motor controller is coupled to a motor 130. Motor 130 is responsible for adjusting the lengths of legs 30. In the preferred embodiment, a single motor 130 is capable of adjusting the lengths of all legs 30 of the desk 100. However, multiple motors may be used without deviating from the spirit of the invention. In an alternate embodiment, the motor controller may also be built into the microcontroller 110.

Microcontroller is electrically coupled to LED 20. Depending on the current operational mode of the desk 100, the microcontroller alters the light variations of LED 20. Additionally, microcontroller 110 is electrically coupled to sensor 10. In an alternative embodiment, microcontroller 110 may be a part of an integrated circuit board which have both LED 20 and sensor 10 mounted thereupon.

Figure 7:
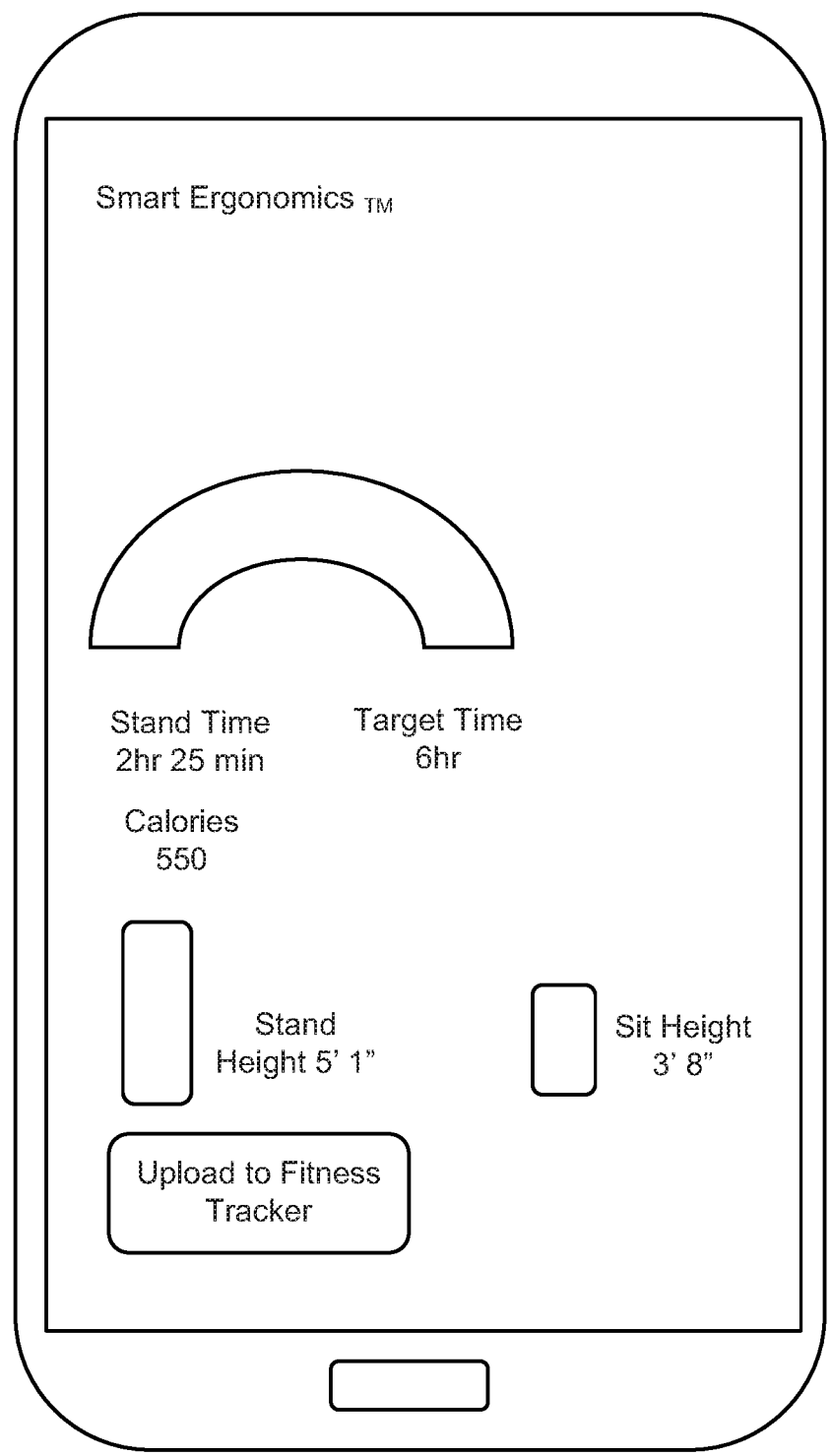
FIG. 7 is an exemplary graphical user interface for a mobile application operating in conjunction with the adjustable standing desk in accordance with the invention.

The wireless transceiver 140 is operable with a portable handheld device 150 having a mobile application 160 designed to interact with adjustable desk 100. The wireless transceiver may transmit directly to the portable handheld device 150 or via the internet thru a Wi-Fi connection and a remote cloud server 170. FIG. 7 shows an exemplary graphical user interface of mobile app 160 as will be discussed more in detail. Typical smart phones include wireless communication features such as Bluetooth or Wi-Fi. In a setup mode, the smart phone may be paired with desk 100 via the wireless transceiver 140. When a compatible mobile application is in use, usage data from desk 100 is sent to the mobile app 160. Additionally, if the desk 100 is connected to a remote cloud server 170 via Wi-Fi, mobile app 160 may retrieve the usage data from the remote cloud server 170.

Figure 4:
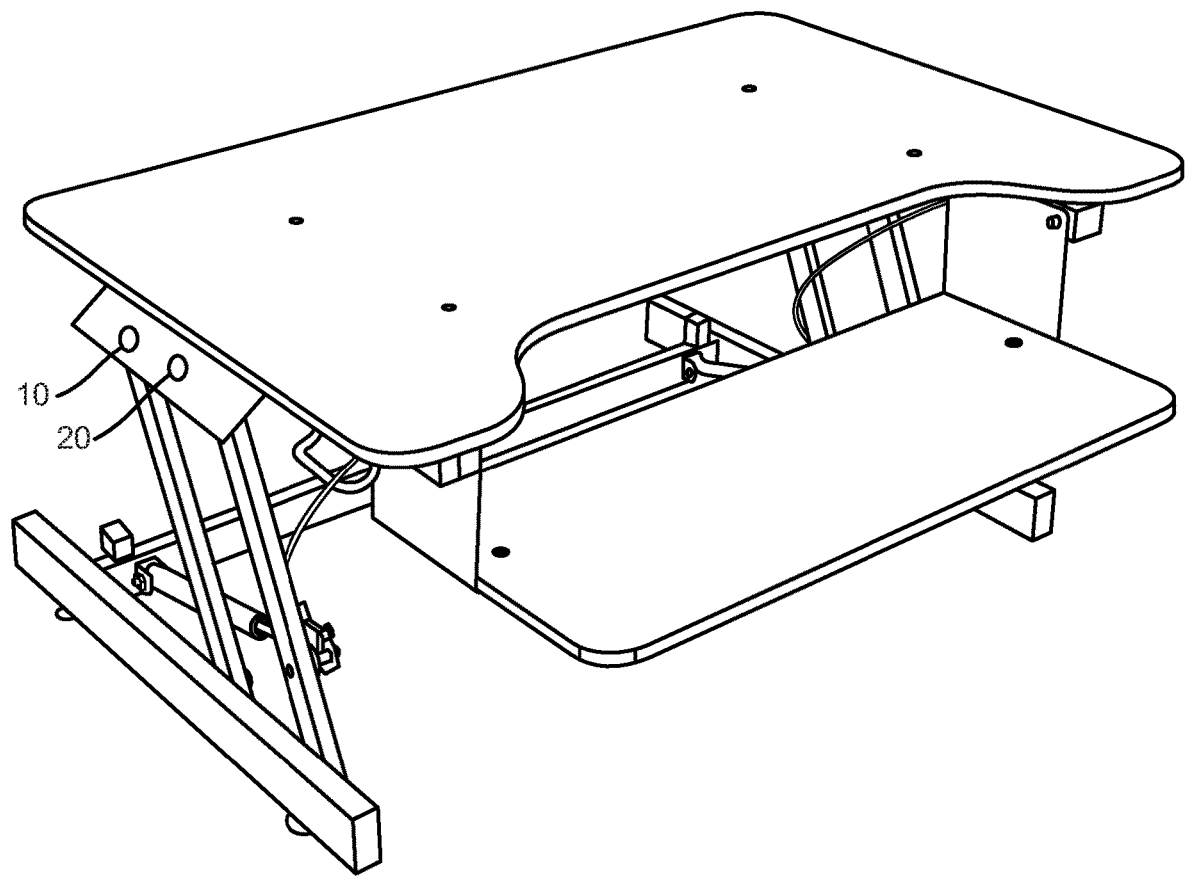
FIG. 4 is an alternate embodiment of the adjustable standing desk which sits on a standard desk.

FIG. 4 is an alternate embodiment of the adjustable height standing desk of the present invention. In addition to desks which are fully supported from the floor, the present invention is applicable to automatically adjustable desktops. Rather than purchasing an entirely new desk, a user may integrate a desktop with his existing desk to adjust the height of the desktop surface. As shown in FIG. 4, the alternate embodiment preferably includes a similar sensor 10 and LED 20. However, in the desktop form, the preferred height adjustment would be performed by an automatic hydraulic as the desktop form typically has a standard sitting height of only a few inches. For example, the typical adjustable desktop height ranges from 4" inches seated and 36" standing.

Figure 5:
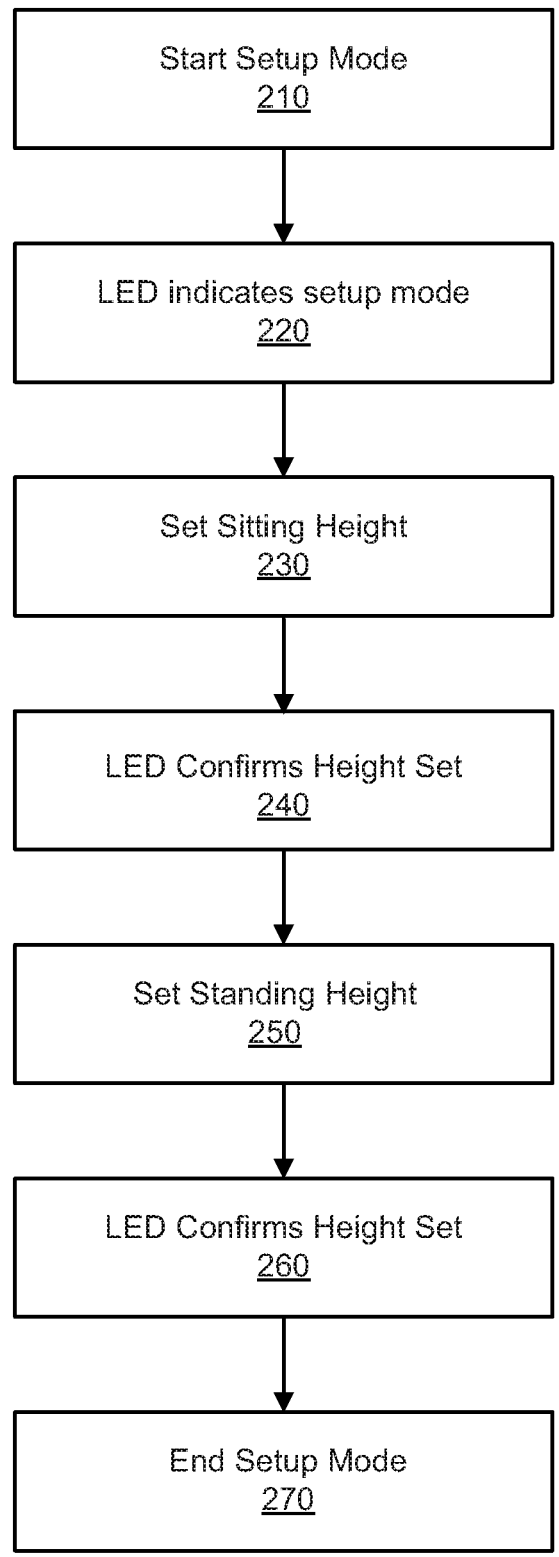
FIG. 5 is a flow chart detailing setup of the automatic adjustable heights for the adjustable standing desk in accordance with the invention.

FIG. 5 is a flow chart describing the operation of the adjustable desk in setup mode. A user may enter setup mode using the mobile application, by specific triggers at the sensor 10, or any other means. Once setup mode is active 210, an LED indicates 220 that the adjustable standing desk is no longer in normal operation mode and is in setup mode. While in setup mode, the user may move the adjustable standing desk to a first sitting height position 230 via sensor 10, buttons, manually, thru the mobile application or any other means for adjusting the height of the desk 100. Once the adjustable height desk has stored the sitting height, LED will provide an indication that setup of the sitting height is complete.

Subsequently, the user moves the adjustable standing desk to a second standing height position 230 via sensor 10, buttons, manually, thru the mobile application or any other means for adjusting the height of the desk 100. Once the adjustable height desk has stored the standing height, LED will provide an indication that setup of the standing height is complete.

In an alternate embodiment, an eye detection sensor may be used in conjunction with desk 100 to optimize the standing and sitting heights. For example, the desk of the present invention may provide the addition of a port (e.g. USB) to allow for the addition of an accessory. A webcam or retina scanner may be connected to desk via the port. When in use, the webcam or retina scanner is typically attached to a desired monitor placed on the desk. The webcam or retina scanner searches for the position of the user's eye level to determine the optimal height for both the sitting and standing heights.

Although an eye detection sensor may be used in conjunction with desk to optimize standing and sitting heights, the webcam may also optimize standing and sitting heights using hand-level detection or a combination of eye-level and hand-level detection.

For most users, whether standing or sitting, the hands typically rest at a 90-100 degree angle away from the user's torso when in the comfortable or ideal position. Additionally, the user's eyes should be typically 40-75 cm away from the placement of any monitors or displays on the table. In a further embodiment of the configuration mode for the sitting height, adjustable standing desk 100 initially begins at the lowest height for the sitting position. The user is then instructed to place his or her hands at a comfortable position. The desk then adjusts the height upward until detection of the user's hands. When the height is reached, desk 100 stores in memory the optimized sitting height for user. Likewise, a user is instructed to place his or hands at a comfortable position while standing. The desk then adjusts the height upwards until detection of the user's hands. When the height is reached, desk 100 stores in memory the optimized standing height for user.

The invention contemplates the storing of additional standing and sitting heights, user preference data, so that the desk may be used by multiply individuals of a household or an office. In one embodiment, switching between user profiles having different user preference data can be done via a gesture control or a switch. In another embodiment, the webcam or retina scanner may also be used for switching profiles and to identify a new user of the desk and set up a new profile having additional present heights. In a further embodiment, a bio-metric scanner, such as a fingerprint reader, may be incorporated to identify a user from the stored user profiles. Those skilled in the art would recognize that a number of other methods can be used to switch user profiles that would not deviate from the spirit of the invention.

Because of the advancements in current smart phone cameras and software, camera smart phones with compatible software may be used instead of a webcam or retina scanner. Like the webcam or retina scanner, the smart phone may be attached to a monitor during setup mode and used to optimize the height of the sitting and standing modes.

Figure 6:
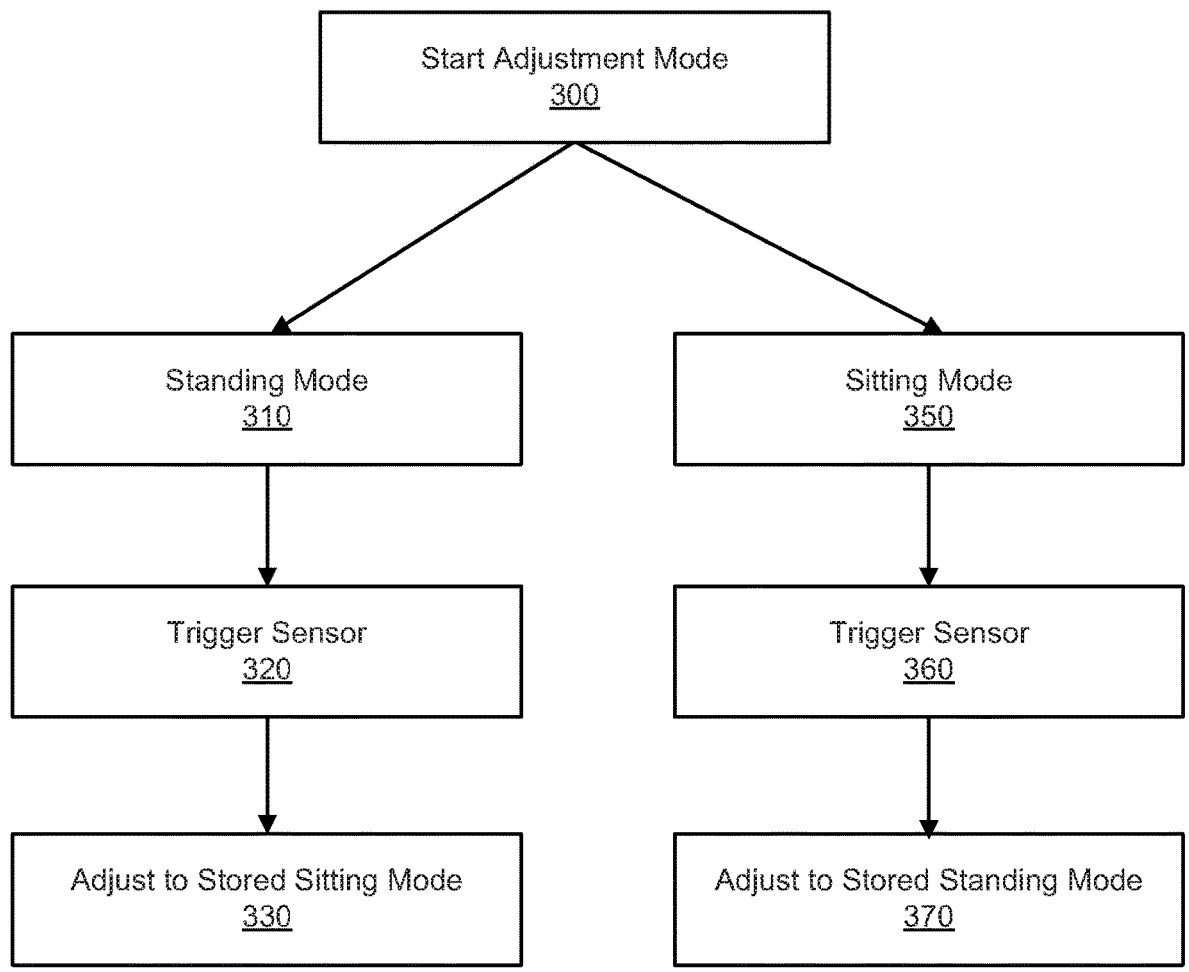
FIG. 6 is a flow chart describing steps of the typical use of the adjustable standing desk in accordance with the invention.

FIG. 6 is a flow chart describing the normal operation of the adjustable height desk 100. In typical operation, the desk is in ready for adjustment mode 300. However, the desk may be equipped with a mechanism which activates or deactivates a default ready for adjustment mode 300. If the desk is in standing mode 310, a user may switch positions by lowering his or her hand downwards near the sensor to trigger the sensor 320 to indicate to the desk to move automatically to a sitting position. In step 330, the desk then adjusts to the stored sitting height for the user.

Continuing with FIG. 6, when the desk is in sitting mode 350, a user may trigger sensor 360 by raising his or hand upwards near the sensor to raise the desk to the sitting height. In step 370, the desk then adjusts to the stored standing height for the user. In an alternate embodiment, the user may simply apply pressure to the bottom of the desk by pushing upward and the desk will switch from the sitting to standing position or vice versa. In this alternate embodiment, pressure applied to the top of the desk would be ignored as items placed on the desk will constantly exert a downward pressure.

In an alternate embodiment operating in conjunction with the camera and/or retina scanner, the desk may automatically adjust to the preset standing or sitting heights based on detection of the height level of the user after a predetermined period. For example, a user uses the desk at a sitting height in the morning. At lunch time, the user leaves for a period of time. Upon returning after 30 mins, the user elects to use the desk at a standing height after eating. The camera and/or retina scanner detects, for a predetermined amount of time, that the user is in front of the desk but not at the sitting position and as such automatically adjusts the desk to the standing position.

In another alternate embodiment operating in conjunction with the camera and/or retina scanner, the desk may include an auto scan mode. In this example, the auto scan mode works without the need for setting up stored sitting and standing heights. When the auto scan mode is enabled, the desk detects the presence of an individual standing or sitting in front of the desk for a predetermined time. In auto scan mode, visual cues are given by the LED to indicate that the desk is currently auto scanning. Additionally, other audio cues may also be integrated such that a user standing in front of the desk recognizes that the desk is in auto scan mode. To detect the presence of a user for a predetermined time, auto scan mode makes a number of predetermined cycles to identify a user's eye-level and adjust accordingly. However, if no user's eye level is identified during the predetermined cycles, the operation ceases until the detection of another user arrives within the proximity of the desk. In an alternate embodiment, auto scan includes the use of a sensor to confirm that no objects are directly below the desk before any adjustment of the desk height occurs.

FIG. 7 is rendering of an exemplary graphic user interface for a mobile application operating in conjunction with the adjustable standing desk in accordance with the invention. As shown in FIG. 7, an exemplary embodiment of the mobile app for use with the adjustable standing desk of the present invention includes a visual representation of the amount of time per day the user has been using the desk in standing mode in comparison to the user's preset target time. The mobile app may also display the number of calories the user exerted in the standing mode as opposed to sitting. The mobile app also displays the user's stored standing and sitting heights. All the data accessible by the mobile app may be sent for use with fitness tracking apps which may employ wearable devices. The mobile application may also provide weekly summaries of the usage data.

While connected to the adjustable standing desk, the mobile app may also be employed to adjust the height of the desk or adjust the height from the preset standing and sitting heights. The mobile app may also include speech recognition which allows for adjustment of standing and sitting heights using voice input.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

What is claimed is:

1. An adjustable height desk comprising:
a plurality of height adjustable legs;
a motor coupled to the plurality of height adjustable legs;
a controller for controlling the motor;
memory coupled to the controller,
wherein the memory stores at least a first height for a user for use of the desk in a sitting position and a second height for the user for use of the desk in a standing position;
wherein the first and second heights are optimized using hand-level detection or a combination of eye-level and hand-level detection; and
at least one motion sensor, wherein the motion sensor is configured to detect a user gesture and initiate a signal to the controller to adjust the desk from the first height to the second height; and wherein the motion sensor is configured to detect an upward or downward hand gesture.

2. The adjustable height desk of claim 1 further comprising, a wireless transceiver configured to transmit preference data comprising the stored first height and the stored second height to a mobile device.

3. The adjustable height desk of claim 1 further comprising, a wireless transceiver configured to transmit usage data comprising an amount of time used by a user in the sitting position and an amount of time used by a user in the standing position to a mobile device.

4. The adjustable height desk of claim 1 further comprising,
a camera capable of detecting a user's eye level for optimally setting the first and second heights.

5. The adjustable height desk of claim 1 further comprising,
means for selecting between user profiles, wherein each profile includes a first and second height.

6. The adjustable height desk of claim 1, wherein the memory stores a third height for a second user for use of the desk in a sitting position and a fourth height for the second user for use of the desk in a standing position;
further comprising a bio-metric scanner operable to switch between the first user and second user in the memory.

7. The adjustable height desk of claim 6 wherein the biometric sensor operable to switch between first and second user profiles comprises a fingerprint reader.

8. The adjustable height desk of claim 6 wherein the biometric sensor operable to switch between first and second user profiles comprises a webcam.

9. The adjustable height desk of claim 1, further comprising:
a camera operable to detect a hand-level of the user.

10. An adjustable height desk comprising:
a plurality of height adjustable legs;
a motor coupled to the plurality of height adjustable legs;
a controller for controlling the motor;
a memory coupled to the controller,
wherein the memory stores at least a first height for a user for use of the desk in a sitting position and a second height for the user for use of the desk in a standing position; and
at least one motion sensor, wherein the motion sensor is configured to detect a singular user gesture and initiate a signal to the controller to adjust the desk from the first height to the second height based solely on the singular gesture, wherein the at least one motion sensor comprises two motion sensors disposed on opposing sides of the desk, configured to require simultaneous operation to initiate the signal to the controller.

11. An adjustable height desk comprising:
a plurality of height adjustable legs;
a motor coupled to the plurality of height adjustable legs;
a controller for controlling the motor;
memory coupled to the controller,
wherein the memory stores at least a first height for a user for use of the desk in a sitting position and a second height for the user for use of the desk in a standing position;
wherein the first and second heights are optimized using hand-level detection or a combination of eye-level and hand-level detection;

at least one motion sensor, wherein the motion sensor is configured to detect a user gesture and initiate a signal to the controller to adjust the desk from the first height to the second height; and a camera operable to detect whether the user is present; wherein the camera in conjunction with the controller and memory stores an amount of time the user is present.

\* \* \* \* \*